United States Patent [19]
Ohishi

[11] Patent Number: 5,237,229
[45] Date of Patent: Aug. 17, 1993

[54] MAGNETIC BEARING DEVICE WITH A ROTATING MAGNETIC FIELD

[75] Inventor: Tetsuo Ohishi, Ise, Japan

[73] Assignee: Shinko Electric Co., Ltd., Tokyo, Japan

[21] Appl. No.: 869,778

[22] Filed: Apr. 16, 1992

[51] Int. Cl.⁵ ............................................. H02K 7/09
[52] U.S. Cl. ................................. 310/90.5; 310/156; 310/181
[58] Field of Search ............... 310/90.5, 156, 179, 310/181, 231, 261

[56] References Cited

U.S. PATENT DOCUMENTS

| | | | |
|---|---|---|---|
| 4,040,681 | 8/1977 | van der Heide | 310/90.5 |
| 4,128,280 | 12/1978 | Purtschert | 310/90.5 |
| 4,841,204 | 6/1989 | Studer | 318/254 |
| 5,111,102 | 5/1992 | Meeks | 310/90.5 |
| 5,117,142 | 5/1992 | von Zweybergk | 310/156 |

FOREIGN PATENT DOCUMENTS

| | | |
|---|---|---|
| 0192836 | 9/1986 | European Pat. Off. . |
| WO88/07842 | 10/1988 | PCT Int'l Appl. . |
| 2187045 | 8/1987 | United Kingdom . |

Primary Examiner—Steven L. Stephan
Assistant Examiner—Matthew Nguyen
Attorney, Agent, or Firm—Darby & Darby

[57] ABSTRACT

The invention presents a novel magnetic bearing device of a simple design and construction, so that it can be attached to the ends of the driving shaft of a synchronous motor or a servomotor. The device consists of: a rotor having a number of permanent magnets, mounted on a central shaft where the central shaft is connected to a driving shaft of a rotating load of an external apparatus; and a stator surrounding the rotor with an airgap. The stator of the bearing device is provided with a number of electromagnets on the inner circumference which can be energized successively so as to create a rotating magnetic field constituted by opposing or attracting polarities to the field effect polarities created by the moving permanent magnets. An integration of the vertical force components over the inner circumference of the stator provides the total magnitude of the levitation force to support the external load. A theoretical analysis indicates that the levitation force is a constant when the number of poles of the rotating magnetic field is one more that of the PM magnetic field.

9 Claims, 6 Drawing Sheets

ROTOR=2POLES STATOR=8POLES

FIG.5

ROTOR=6POLES STATOR=8POLES

FIG.6

ROTOR=8POLES STATOR=10POLES

FIG.7
ROTOR=10POLES  STATOR=12POLES

ROTOR=6POLES STATOR=4POLES

FIG.11

ROTOR=8POLES STATOR=6POLES

FIG.12

ROTOR=10POLES STATOR=8POLES

MAGNETIC BEARING DEVICE WITH A ROTATING MAGNETIC FIELD

FIELD OF THE INVENTION

The present invention relates to a magnetic bearing device which provides a noncontacting load support, and are useful in applications involving space related equipment and highspeed machines.

BACKGROUND OF THE INVENTION

Magnetic bearings are designed to provide a freely rotatable support to a rotating load without contacting the load, by utilizing the magnetic forces of attraction or repulsion. Such bearings feature low coefficient of friction, low vibration and low operating noise. Because they are applicable to equipment involving ultra highspeed rotations or vacuum systems, magnetic bearings are used in such critical applications as reaction wheels of satellite gyroscopes and in vacuum pumps for expelling gases from vacuum containers.

Figure 17:
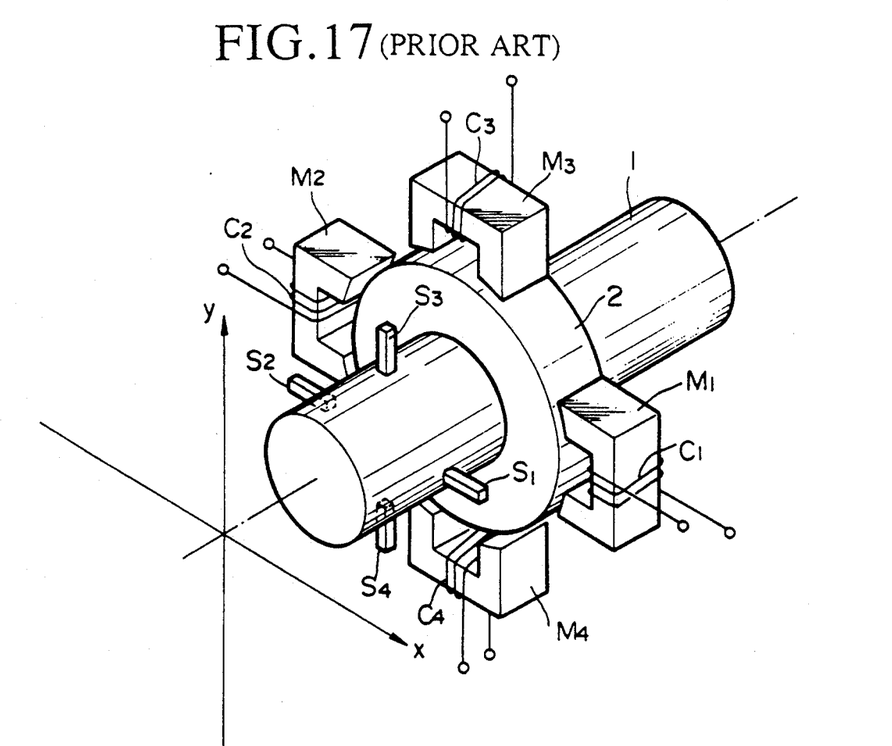
FIG. 17 is a perspective view showing a part of the construction of a conventional magnetic bearing.

FIG. 17 is a perspective view showing a part of the construction of a conventional type of magnetic bearings. The numeral 1 refers to a freely rotatable shaft, 2 is a cylindrical rotor which is fixed to a part of the outer periphery of the shaft, and is composed of layers of soft iron. $M_1$-$M_4$ refer to four electromagnets facing and surrounding the shaft, and disposed on the outer periphery of the rotor 2 with an airgap therebetween. The magnets $M_1$ and $M_2$ which are disposed along the x-axis face each other, and the magnets M3 and M4 which are disposed along the y-axis, orthognal to the x-axis, face each other. These four magnets are firmly fixed to the inner section of the stator. $S_1$-$S_4$ are displacement sensors which are disposed on the outer periphery of the shaft 1 with an airgap, to sense the radial displacement of the shaft 1 and the rotor 2. They are disposed in the same relative spatial relationship as the electromagnets $M_1$-$M_4$, and are fixed to the inner surface of the stator.

Such a magnetic bearing operates in the following way. A magnetizing current is passed through the coils $C_1$ and $C_2$, for energizing the corresponding electromagnets $M_1$ and $M_2$, the rotor 2 becomes aligned with the positive and negative poles along the x-axis; when a magnetizing current is passed through the coils $C_3$ and $C_4$, for energizing the electromagnets M3 and M4, the rotor 2 becomes aligned with the positive and negative poles on the y-axis, the combined effect produces leviation of the rotor 2 in an equilibrium balancing position between the two sets of magnetic forces. Although not shown in this figure, another magnetic bearing is arranged at the opposite end to support the shaft 1 in the horizontal direction, and a magnetic bearing is placed in the mid-portion of the shaft 1 in the thrust direction. Therefore a total of five sets of magnetic forces provide support to the shaft 1 so as to permit the shaft 1 to rotate freely without contacting any of the support sections.

Because of the design concept that a number of electromagnets M1 to M4 are fixed firmly on the inner periphery of the stator in the conventional types of magnetic bearings, the structure became complex and the overall apparatus incorporating such a conventional magnetic bearing could not be made compact.

SUMMARY OF THE INVENTION

This invention was made in view of the problems with the design of the existing magnetic bearing devices described above. The objective is to provide a magnetic bearing device having a relatively simple and economic construction so as to enable economical manufacturing of a compact apparatus based on such a magnetic bearing device.

The magnetic bearing device of the present invention comprises: (a) a rotor mounted on a shaft via an iron core, wherein a plurality of regularly spaced permanent magnets (PM) are attached to the exterior periphery of the rotor; and (b) a stator surrounding said plurality of permanent magnets (PM) with an airgap therebetween, wherein a plurality of regularly spaced alternating current electromagnets are disposed on the inner circumferential periphery thereof; wherein said electromagnets are energized successively while said loaded shaft is rotating, so as to generate a rotating magnetic field, moving along the inner circumference of the stator, having a number of poles which is defined by the number of poles on said rotor, thereby forming a magnetic bearing to freely support said rotating load shaft.

According to the configuration as described above, if a rotating magnetic field is generated through energization of the electromagnets on the stator while the rotor is rotating at a certain speed, the rotating magnetic field becomes subject to a displacement force operating in a given direction and in relative relation to the magnetic poles of the rotor. It then becomes possible to arrange the displacement force so that it is always oriented in the vertical, levitating direction, thereby producing a continuous levitating force.

PREFERRED EMBODIMENTS OF THE INVENTION

Preferred embodiments will be explained below in reference to the figures.

Figure 1:
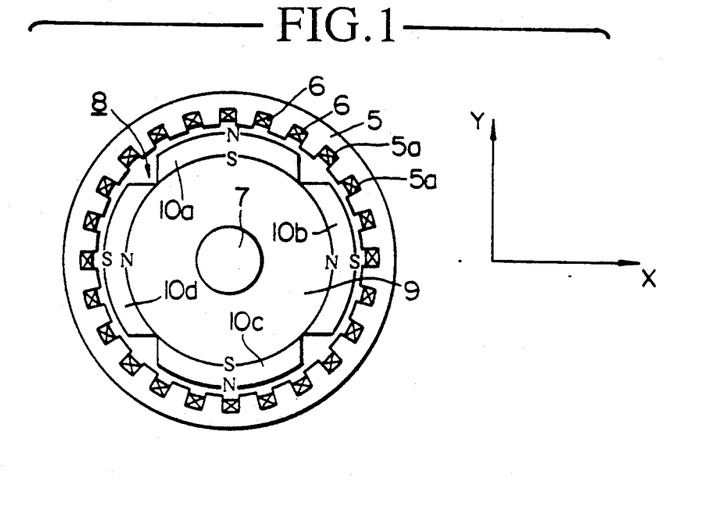
FIG. 1 is a front view showing the configuration of an embodiment of a magnetic bearing.

In FIG. 1, an embodiment is shown, where 5 is a cylindrical stator having a number of grooves 5a, which are spaced evenly around the inner circumferential periphery. Each groove 5a contains a winding 6 arranged in such a way that when the various windings are successively energized, a rotating magnetic field is generated which moves along the inner periphery of the stator. In the interior of the stator is disposed a rotor 8, which comprises an iron core 9 attached to a shaft 7, and four permanent magnets (PM) 10a-10d, which are fixed to the core 9 magnetically. These PM pieces constitute the four magnetic poles which are disposed opposite to the inner surface of the stator 5 with an airgap. Such a configuration is, therefore, the same as the ordinary servomotor or synchronous motor. Further, although not shown in FIG. 1, the stator 5 is provided with opposing displacement sensors, spaced away from the exterior periphery of the shaft 7, to detect the displacement of the shaft 7 and the rotor 8 in the direction of the x and y axes. Such sensors may be of any noncontacting sensors such as eddy current type.

In a configuration as presented above, by energizing the windings 6 in the stator 5 successively, a rotating magnetic field is generated along the inner periphery of the stator 5 having the number of magnetic poles equal to two more or two less than the number of magnetic poles of the rotating field. It is then possible to create a displacement force in a given direction depending on the rotation of the rotor 8. By choosing the direction to be always in the vertical direction, it becomes possible to create a continual levitating force directed in the upward direction.

At this time, the principle which creates levitating force, rotating along the inner periphery of the stator 5, will be explained for the case of N=M+2 and N=M−2, where N is the number of poles of the rotating field, and M is the number of poles of the PM pieces on the core.

For the case of N=M+2

Figure 2:
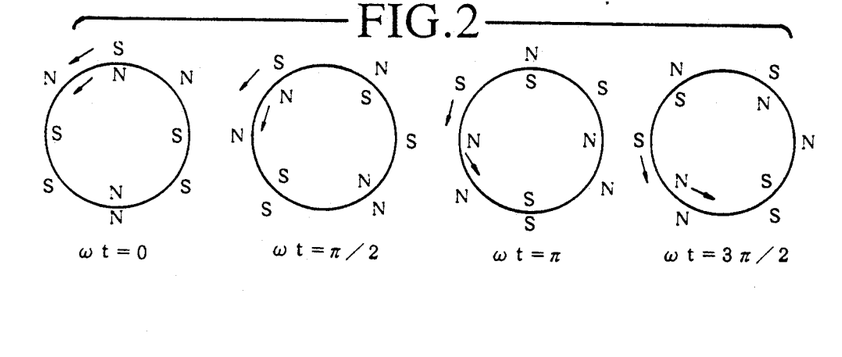
FIGS. 2 to 7 illustrate the motions of the rotating magnetic poles N and the magnetic poles M in an embodiment in which the relationship $N=M+2$ prevails.

FIG. 2 illustrates how the relative positions of the poles of the stator 5 and of the rotor 8 change when, for example, N=6 and M=4. In this figure, the symbols outside the circle indicate the polarity of the stator 5, and those inside the circle indicate the polarity of the rotor 8, and each magnetic field rotates in the direction indicated by the respective arrows.

The magnetic flux density Br produced by the rotating permanent magnets 10a–10d, i.e. field effect flux, is given by:

$$Br = Bm \cdot Cos(\omega t + 2\theta) \quad (1)$$

where Bm is the maximum density of magnetic flux, and $\omega$ is the angular velocity, t is the time, $\theta$ is the angular coordinate. The flux density Bs of the rotating magnetic field rotating along the inner surface of the stator 5 is given by:

$$Bs = Bf \cdot Cos(\omega t + 3\theta) \quad (2)$$

where Bf is the peak flux density.

As shown in FIG. 2, when $\omega t = 0$, the attractive force between the south pole S and the north pole N, and the repulsive force between the two south poles S act together to form a combined levitating force. Even when $\omega t$ varies from $\pi/2$, $\pi$ and to $3\pi/2$, the combined forces produced by polarity combinations are always acting in the upward direction, thereby producing a continual levitation force. The magnetic flux density in the airgap between the stator 5 and the rotor 8 can be regarded as a composite flux between the magnetic flux density Br due to the field effect (hereinafter referred to as the PM field), and the rotating magnetic flux density Bs, therefore, it can be expressed as;

$$\begin{aligned}B &= Br + Bs \\ &= Bm \cdot Cos(\omega t + 2\theta) + Bf \cdot Cos(\omega t + 3\theta)\end{aligned} \quad (3)$$

When a magnetic flux B exists between a pair of opposing magnetic poles of cross sectional area S, the magnitude of the force which acts on the end face of the poles is given by;

$$F = (B^2/2\mu_0) \cdot S \quad (4)$$

where $\mu_0$ is the permeability of the airgap. Because the flux density is nonuniform, and the flux is directed to the center of the shaft, the force of attraction or repulsion acting in the airgap is a function of the angular coordinate $\theta$, and its direction is pointing toward the center of the shaft. Therefore, for an element of cross section $\triangle S$, and for each sector of angular displacement $\theta$, the sector force $F(\theta)$ is given by:

$$F(\theta) = (B^2/2\mu_0) \triangle S \quad (5)$$

Therefore, by integrating vertical components (for $\theta = 0$) over the circumference, the levitation force F is obtained. In other words, the force of attraction acting on the rotor 8 is a vertical component of the sector force radiating toward the stator 5, and the total force F for levitation can be obtained by summing the components for $\theta = 0$ over the entire inner circumference. Therefore, the expression for F is:

$$\begin{aligned}F &= \int_0^{2\pi} F(\theta) Cos\theta d\theta \\ &= \frac{1}{2\mu_0} \int_0^{2\pi} \{BmCos(\omega t + 2\theta) + BfCos(\omega t + 3\theta)\}^2 Cos\theta d\theta \\ &= \frac{1}{2\mu_0} \bigg\{ Bm^2 \int_0^{2\pi} Cos^2(\omega t + 2\theta) Cos\theta d\theta + \\ &\quad Bm \cdot Bf \int_0^{2\pi} Cos(\omega t + 2\theta) Cos(\omega t + 3\theta) Cos\theta d\theta + \\ &\quad Bf^2 \int_0^{2\pi} Cos^2(\omega t + 2\theta) Cos\theta d\theta \\ &= \frac{Bm \cdot Bf}{2\mu_0} \pi\end{aligned} \quad (6)$$

From the above equation (6), it can be seen that a constant levitation force F is obtained irrespective of the values of $\omega t$. It is clear that by altering the magnitude of the peak flux density Bf of the rotating magnetic field, it is possible to freely alter the magnitude of the levitation force F.

Figure 3:
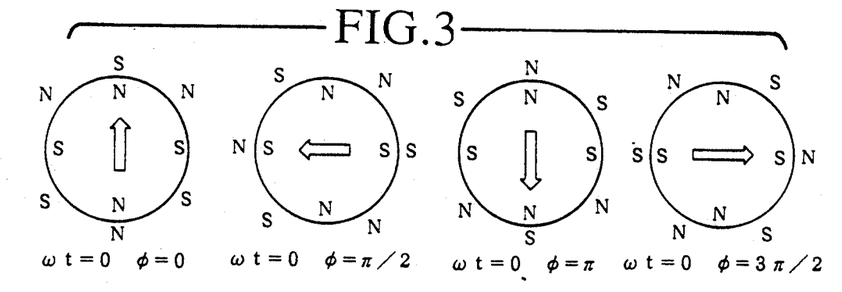

By providing a phase shift angle $\phi$ to the rotating magnetic field rotating along the inner surface of the stator 5, in the above equation (2), $$Bs = Bf \cdot Cos(\omega t + 3\theta + \phi) \quad (7)$$

is obtained. By altering the value of the phase shift angle $\phi$, the direction of the displacement force acting on the rotor 8 can be chosen freely. For example, as shown in FIG. 3, by varying the phase shift angle from 0, $\pi/2$, $\pi$ to $3\pi/2$, the displacement force becomes pointed in the direction shown by the arrows in this figure.

Accordingly, by altering the values of the magnetic rotating flux density Bf and the phase shift angle $\phi$, the magnitude and the direction of the displacement force can be controlled at will. Therefore, by controlling the flux density Bf and the phase shift angle $\phi$, according to the output signals from displacement sensors to sense the relative positional relationship between the stator 5 and rotor 8 (the vertical y-axis and the horizontal x-axis), it is possible to magnetically levitate the rotor 8 continually, and thereby to provide a magnetic bearing device of the present invention.

Figure 4:
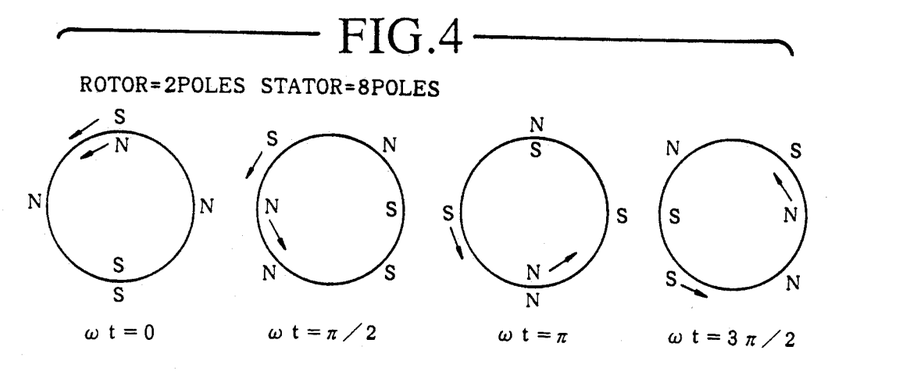
Figure 5:
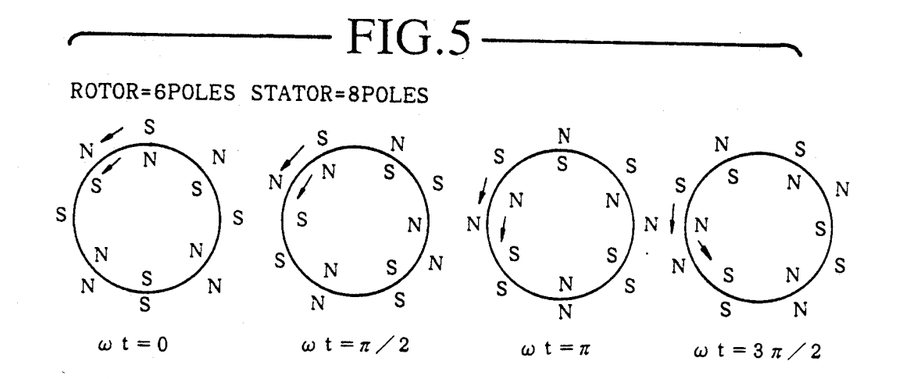
Figure 6:
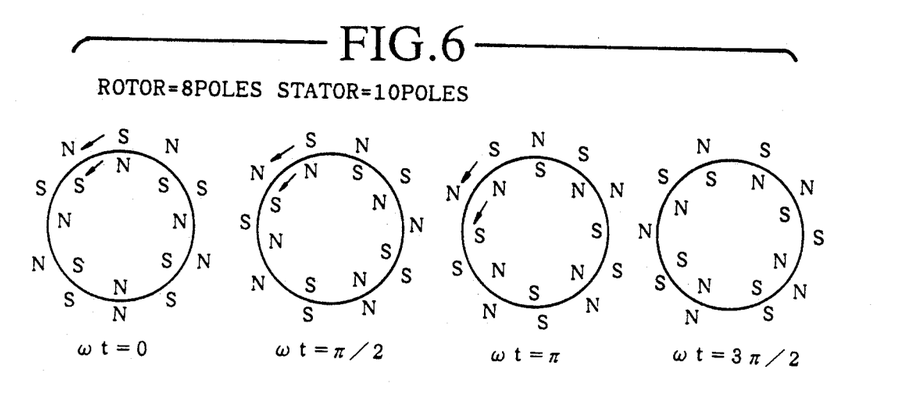
Figure 7:
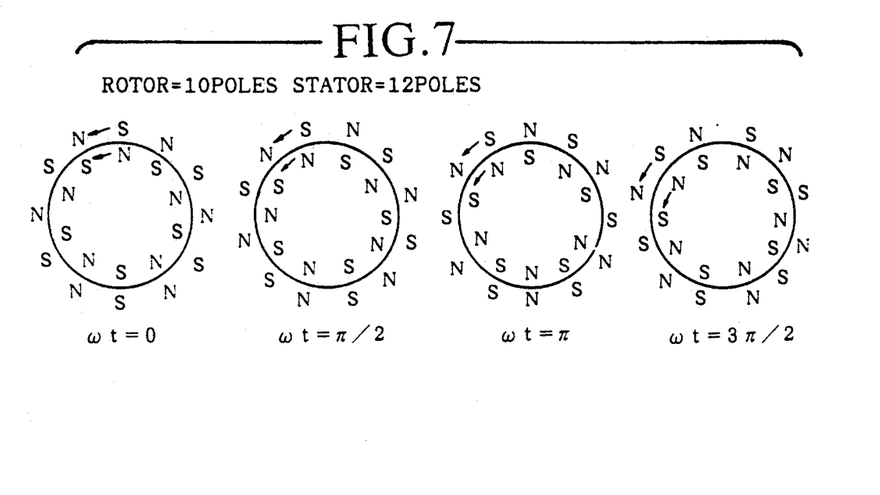

When the number of poles of the rotating field N=4, and that of the PM field M=2, the relative positional relationship of the poles of the rotor 8 and the stator 5 varies as shown in FIG. 4. Similarly, the cases of different combinations of N=8, 10, and 12 with M=6, 8 and 10 are shown in FIGS. 5, 6 and 7, respectively. As shown in these figures, the magnetic levitation is produced when the relationship between N and M, is given by N=M+2.

For the case of N=M−2

Figure 8:
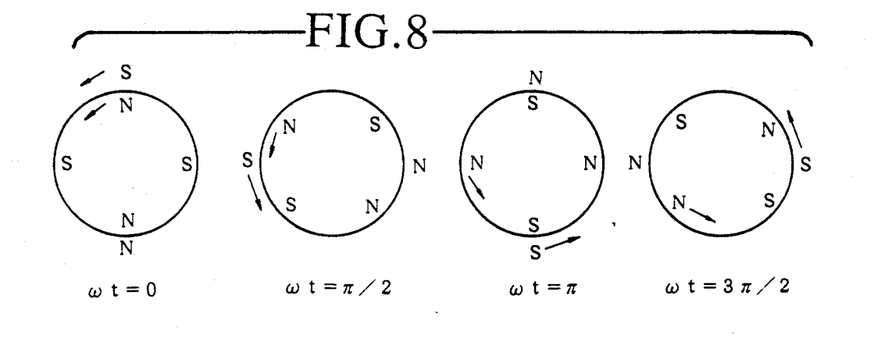
FIGS. 8 to 12 illustrate the motions in the same embodiment when the relationship $N=M-2$ prevails.

For the case of N=2 and M=4, the relative positional relationship between the rotor 8 and the stator 5 and the rotor 8 varies as shown in FIG. 8. In this case, the PM field density Br is given by equation (1), and the rotating magnetic flux density Bs is given by;

$$Bs = Bf \cdot Cos(\omega t + \theta) \qquad (8)$$

As shown in FIG. 8, when $\omega t = 0$, due to the force of attraction between the S and N poles, and the force of repulsion like poles, two N poles and two S poles, the force of levitation to lift the rotor 8 upward is created. Even when $\omega t$ changes from $\pi/2$, $\pi$, and to $3\pi/2$, the composite force created by the appropriate combinations of like poles and unlike poles is always directed upward, thereby creating the continual levitation force of the present invention. As in the previous case, the magnetic flux density in the airgap between the stator 5 and the rotor 8 can be regarded as a composite between the magnetic flux density Br due to the PM field, and the rotating magnetic flux density Bs, therefore, it can be expressed as;

$$\begin{aligned} B &= Br + Bs \qquad (9) \\ &= Bm \cdot Cos(\omega t + 2\theta) + Bf \cdot Cos(\omega t + \theta) \end{aligned}$$

And similar to the previous embodiment, the magnetic force of attraction due to this magnetic flux B as a function of $\theta$ as before is expressed as:

$$F(\theta) = (B^2/2\mu_0) \cdot S \qquad (10)$$

where the symbols are the same as defined in the previous embodiment.

Therefore, by integrating the vertical components (for $\theta = 0$) over the circumference, the magnitude of the total levitating force is obtained, as expressed in the following equation.

$$\begin{aligned} F &= \int_0^{2\pi} F(\theta) Cos\theta d\theta \qquad (11) \\ &= \frac{1}{2\mu_0} \int_0^{2\pi} \{BmCos(\omega t + 2\theta) + BfCos(\omega t + 3\theta)\}^2 Cos\theta d\theta \\ &= \frac{1}{2\mu_0} \left\{ Bm^2 \int_0^{2\pi} Cos^2(\omega t + 2\theta) Cos\theta d\theta + \right. \\ &\quad Bm \cdot Bf \int_0^{2\pi} Cos(\omega t + 2\theta) Cos(\omega t + \theta) Cos\theta d\theta + \\ &\quad \left. Bf^2 \int_0^{2\pi} Cos^2(\omega t + \theta) Cos\theta d\theta \right. \\ &= \frac{Bm \cdot Bf}{2\mu_0} \pi \end{aligned}$$

From the above equation (11), it can be seen that the levitation force F is a constant, independent of $\omega t$. As in the previous embodiment, the magnitude of levitation force F can be chosen freely by selecting the value of the peak flux density Bf of the rotating magnetic field.

Figure 9:
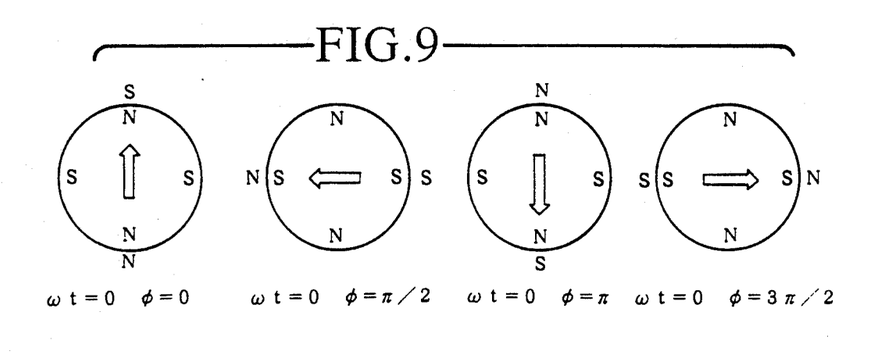

By providing a phase shift angle $\phi$ to the rotating magnetic field, rotating along the inner surface of the stator 5, in the above equation (2), $$Bs = Bf \cdot Cos(\omega t + 3\theta - \phi) \qquad (12)$$

is obtained. By altering the value of the phase shift angle $\phi$, the direction of the displacement force acting on the rotor 8 can be chosen freely. For example, as shown in FIG. 9, by varying the phase shift angle from 0, $\pi/2$, $\pi$ and $3\pi/2$, the displacement force can be directed as shown in this figure.

Accordingly, by altering the values of the magnetic rotating flux density Bf and the phase shift angle $\phi$, the magnitude and the direction of the displacement force can be controlled at will. Therefore, by controlling the flux density Bf and the phase shift angle $\phi$, according to the output signals from displacement sensors to sense the relative positional relationship between the stator 5 and rotor 8 (the vertical y-axis and the horizontal x-axis), it is possible to magnetically levitate the rotor 8 continually, and thereby to provide a magnetic bearing of the present invention.

Figure 10:
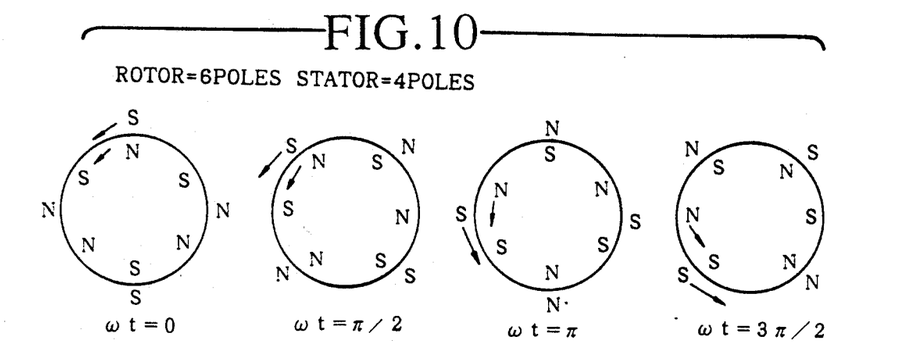
Figure 11:
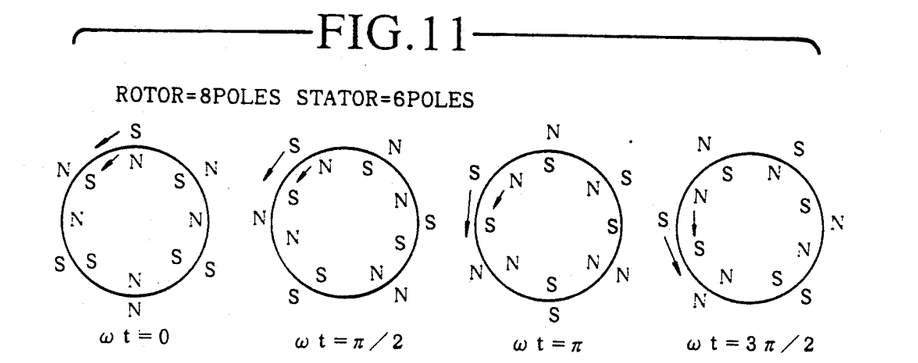
Figure 12:
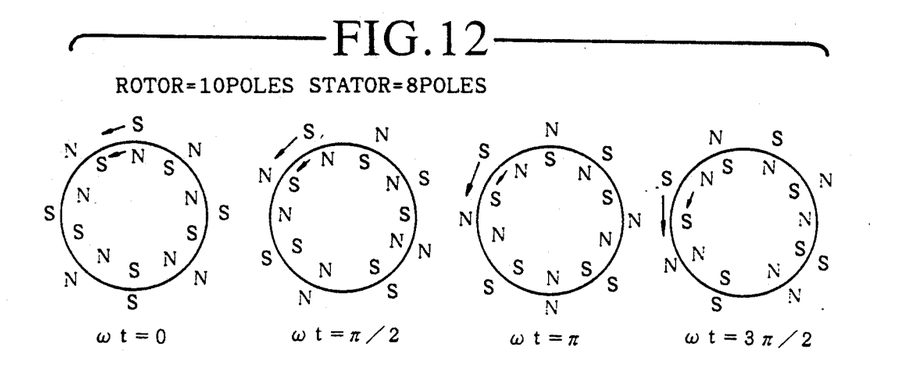

When the number of poles of the rotating field N=4, and that of the PM field M=2, the relative positional relationship of the poles of the rotor 8 and the stator 5 varies as shown in FIG. 10. Similarly, the cases of different combinations of N=8, and 10 with M=8 and 10 are shown in FIGS. 11, and 12, respectively. As shown in these figures, the magnetic levitation is produced when the relationship between N and M, is given by N=M+2.

Next, a general formula will be developed, without specifying the number of M and N. In this case, the magnetic flux B in the airgap between the stator 5 and the rotor 8 is given by:

$$B = BmCos(\omega t + M\theta) + BfCos(\omega t + N\theta) \qquad (13)$$

Defining the radius r and the length L of the airgap, and taking the vertical components ($\theta = 0$) over the entire circumference, the levitation force F can be obtained as follows:

$$\begin{aligned} F &= \frac{rL}{2\mu_0} \int_0^{2\pi} \{BmCos(\omega t + M\theta) + \\ &\quad BfCos(\omega t + N\theta)\}^2 Cos\theta d\theta \qquad (14) \\ &= \frac{BmBfrL}{2\mu_0} \int_0^{2\pi} Cos(\omega t + M\theta) \cdot Cos(\omega t + N\theta) \cdot Cos\theta d\theta \\ &= \frac{BmBfrL}{2\mu_0} \int_0^{2\pi} [Cos\{(M - N)\theta\} + \\ &\quad \underline{Cos\{2\omega t + (M + N)\theta\}}] \cdot Cos\theta d\theta \\ &= \frac{BmBfrL}{2\mu_0} \int_0^{2\pi} [Cos\{(M - N)\theta\} \cdot Cos\theta + \\ &\quad \underline{Cos\{2\omega t + (M + N)\theta\} \cdot Cos\theta}]d\theta \\ &= \frac{BmBfrL}{2\mu_0} \int_0^{2\pi} [Cos\{(M - N - 1)\theta\} + \\ &\quad Cos\{(M - N + 1)\theta\} + \underline{Cos\{2\omega t + (M + N - 1)\theta\}} + \\ &\quad \underline{Cos\{2\omega t + (M + N + 1)\theta\}}]d\theta \end{aligned}$$

Since the underlined portions in the above equation 14 are zero, F becomes:

$$F = \frac{BmBfrL}{2\mu_0} \int_0^{2\pi} [\cos\{(M - N - 1)\theta\} + \cos\{(M - N + 1)\theta\}]d\theta \quad (15)$$

In the above equation (15), when $M-N=\pm 1$, the force F becomes:

$$F=(Bm \cdot Bf \cdot r \cdot L \cdot \pi)/2 \, \mu_0 \quad (16)$$

and it can be seen that when the relationship between the number of poles of the rotating magnetic field and that of the PM field becomes $N=M\pm 1$, the levitation force becomes a fixed value.

As demonstrated in the above embodiments, when a rotating magnetic field is generated by the electromagnets on the stator while the rotor is rotating at a given speed, it is possible to provide to the rotor with a force for displacement directed in one direction, and by setting this force to be always directed upward, a continual levitation force is generated. Because the basic construction of the magnetic bearing device is similar to that of servomotors and synchronous motors, it is possible to attach magnetic bearing devices on such motors by arranging so that the invented device can be assembled on the ends of the motor shaft of such motors, or by arranging so that the electromagnet windings for magnetic bearing device can be added as a unit to the windings on the servomotors. The invented design of magnetic bearing device is superior to the conventional designs in which a number of electromagnets are required to be firmly fixed to the stator. The invention offers advantages because the basic structure is simple, and a magnetic bearing device based on such a design concept can be manufactured relatively economically, and the overall apparatus construction can be made compact.

EXAMPLES

Figure 13:
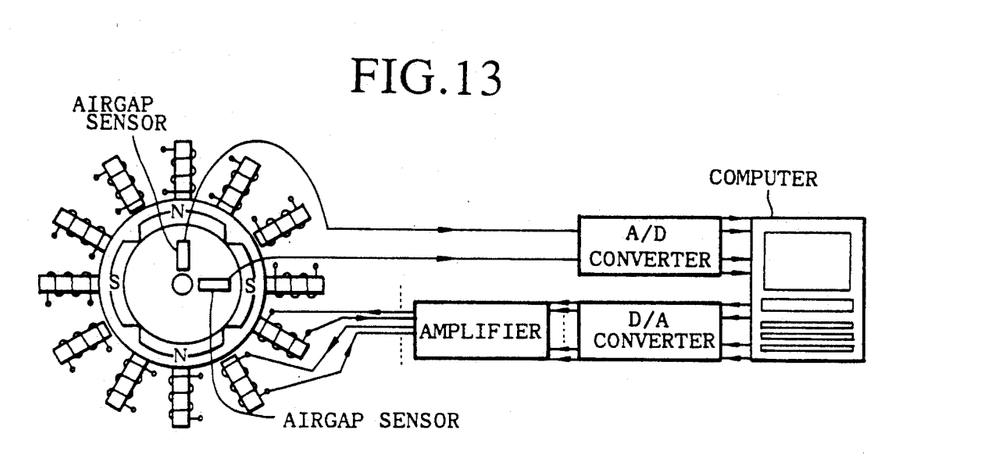
FIG. 13 is a plan view of the arrangement of the adapted testing facility.
Figure 14:
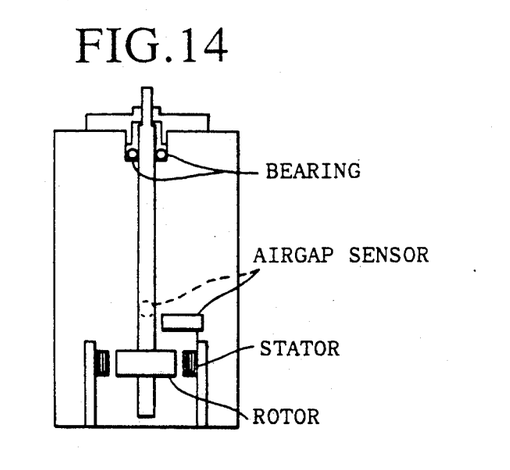
FIG. 14 is a schematic side view of the test device.

To confirm the practical applicability of the levitation control theory presented above, a simple experimental apparatus was set up as shown schematically in FIGS. 13 and 14. FIG. 13 illustrates the method of adaptation of the stator windings of a torque motor to the stator of the invented device. The rotor of the magnetic bearing device was handmade with four magnetic poles of rubber magnet which had a weak magnetic flux of about 0.02 T (tesla). One end of the motor shaft was supported by a ball bearing and the other end was attached to the levitating motor, as shown in FIG. 14. The rotor had a diameter of 72 mm, the width of 25 mm, and the airgap of 0.7 mm. The rotating torque was produced by a 4-pole distributed current with a synchronized motor control, while the levitation was functioned with the 6-pole current control.

The levitation current, $i_F$, through the stator is given by the following equation:

$$i_F = I_F[V_x(\sin\omega t + 3 \, \theta)/V_{ymax} - V_x(\cos\omega t + 3 \, \theta)/V_{xmax}]$$

where
$I_F$ is the maximum levitation current;
$V_x$ is the output voltage from the sensor in the x direction;
$V_{xmax}$ is the maximum output voltage of the sensor in the x direction;
$V_y$ is the output voltage from the sensor in the y direction;
$V_{ymax}$ is the maximum output voltage of the sensor in the y direction.

Figure 15:
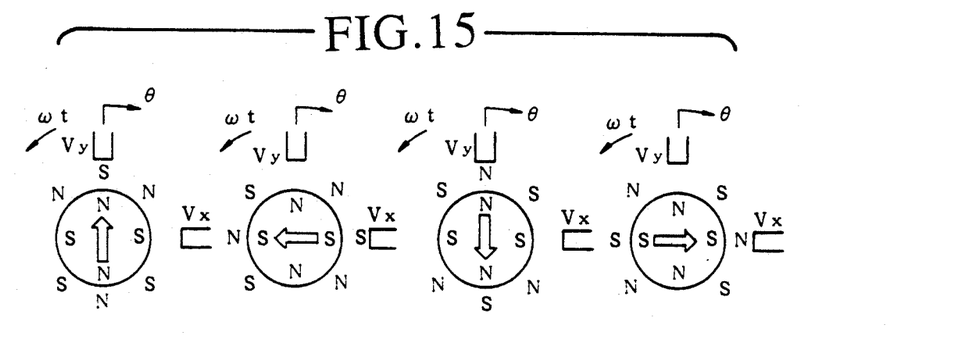
FIG. 15 illustrates the motions of the rotating maganetic poles in the test device.

When such a current $i_F$ is applied, the relative polarities of the magnetic poles of the stator and the rotor change as illustrated in FIG. 15.

The maximum current was 2 A with about 40 turn windings on each pole. Two airgap sensors were installed near the rotor to produce the levitation control signal. Standard 80386 microprocessor was used to calculate each current of 12 concentrated coils of the stator. The levitation control algorithm used was the classical PD controller:

$$G(z) = K_p + K_D(z-1)/T_D(z - e(-\tau/T_D))$$

where $K_p$, $K_D$, $T_D$ and $\tau$ are the proportional gain, derivative gain, derivative time constant and the sampling interval respectively. The sampling interval used was 1 ms with the C (microprocessor) control program.

Figure 16:
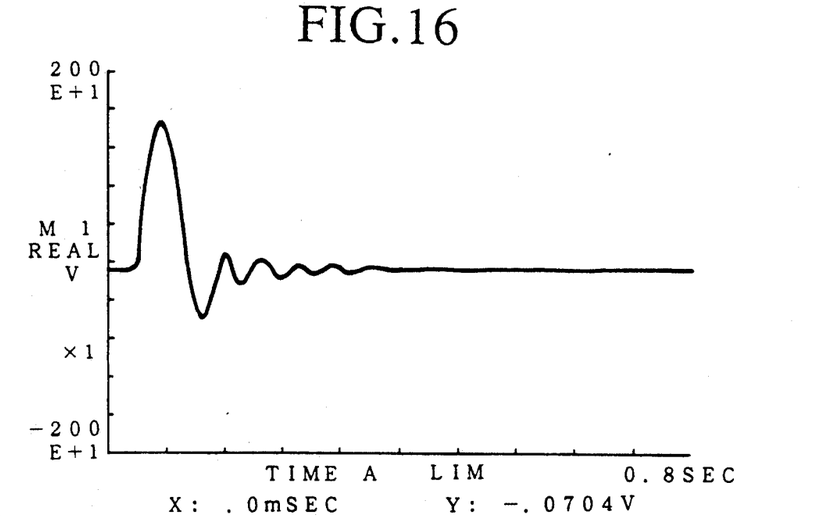
FIG. 16 shows the results of impulse response of the test device.

The levitated impulse response for radial direction is shown in FIG. 16. Because of the low magnetic flux, levitation force was low. With the levitation control, the rotating speed was gradually increased by the 4 phase synchronous motor control to 250 rev/min. The rotating torque was also low because of the weak magnet. However, the validity of the proposed levitation control algorithm was experimentally proven.

What is claimed is:
1. A magnetic bearing device formed in a casing for freely supporting a rotating loaded shaft, comprising:
    (a) stator means for generating a rotating magnetic field comprising a plurality, N, of electromagnets disposed along an inner surface of the casing;
    (b) rotor means coupled to said shaft for generating a field effect magnetic flux comprising a plurality, M, of permanent magnets disposed in opposed relationship to and spaced at a distance from said plurality of electromagnets; and
    (c) means for successively energizing said plurality of electromagnets while said loaded shaft is rotating so as to generate a rotating magnetic field producing a force which levitates said shaft.

2. A magnetic bearing device as claimed in claim 1, wherein said plurality of permanent magnets are magnetically coupled to said shaft.

3. A magnetic bearing device as claimed in claim 1, further comprising means for mechanically coupling said magnetic bearing device to an external rotating motive means.

4. A magnetic bearing device as claimed in claim 3, wherein said means for mechanically coupling is connected to a synchronous motor.

5. A magnetic bearing device as claimed in claim 3, wherein said means for mechanically coupling is connected to a servomotor.

6. A magnetic bearing device as claimed in claim 1, wherein one of M and N is two greater than the other.

7. A magnetic bearing device as claimed in claim 1, wherein each of M and N are greater than 2.

8. A magnetic bearing device as claimed in claim 1, further comprising means responsive to displacement of said shaft for shifting the phase of said rotating magnetic field so as to orient a displacement force resulting from interaction between said rotating magnetic field and said field effect magnetic flux in a predetermined levitating direction.

9. A method for operating a magnetic bearing device formed in a casing for freely supporting a rotating loaded shaft, said device including stator means for generating a rotating magnetic field comprising a plurality, N, of electromagnets disposed along an inner surface of the casing, and rotor means coupled to said shaft for generating a field effect magnetic flux comprising a plurality, M, of permanent magnets disposed in opposed relationship to and spaced at a distance from said plurality of electromagnets to define an airgap therebetween which contains said field effect magnetic flux and said rotating magnetic field, said method comprising the step of successively energizing said electromagnets while said loaded shaft is rotating so as to produce a levitating force which is the integral of the vertical components of the magnetic forces in said airgap generated as a result of interaction between said rotating magnetic field and said field effect magnetic flux.

* * * * *